(12) United States Patent
Azema

(10) Patent No.: US 6,192,572 B1
(45) Date of Patent: Feb. 27, 2001

(54) MACHINE-TOOL FOR HIGH SPEED MACHINING ADOPTING AN ERGONOMIC ARRANGEMENT FOR FUNCTIONAL PARTS THEREOF

(75) Inventor: André Azema, Saix (FR)

(73) Assignee: Renault Automation, Boulogne-Billancourt (FR)

( * ) Notice: Subject to any disclaimer, the term of this patent is extended or adjusted under 35 U.S.C. 154(b) by 0 days.

(21) Appl. No.: 09/147,339
(22) PCT Filed: Jun. 3, 1997
(86) PCT No.: PCT/FR97/00976
§ 371 Date: May 27, 1999
§ 102(e) Date: May 27, 1999
(87) PCT Pub. No.: WO97/46352
PCT Pub. Date: Dec. 11, 1997

(30) Foreign Application Priority Data

Jun. 4, 1996 (FR) .................................................. 96 07129

(51) Int. Cl.⁷ ...................................................... B23P 23/00
(52) U.S. Cl. ............................... 29/564; 29/33 P; 409/135
(58) Field of Search ..................................... 409/135, 241, 409/235; 408/234; 29/33 P, 564; 248/678, 679, 346.01, 346.03

(56) References Cited

U.S. PATENT DOCUMENTS

| | | | |
|---|---|---|---|
| 2,903,120 | * | 9/1959 | Thomas ............................. 198/345.3 |
| 4,719,676 | * | 1/1988 | Sansone ............................... 29/33 P |
| 5,361,486 | * | 11/1994 | Harmsen et al. ....................... 29/564 |
| 5,503,082 | * | 4/1996 | Bosma . | 
| 5,645,382 | * | 7/1997 | Homanick et al. .................. 409/135 |

FOREIGN PATENT DOCUMENTS

| | | | |
|---|---|---|---|
| 431334 | * | 7/1926 | (DE) . |
| 0203035 | * | 11/1986 | (EP) . |
| 2109278A | * | 6/1983 | (GB) .................................. 29/33 P |
| 0009644 | * | 1/1985 | (JP) ...................................... 29/564 |

* cited by examiner

Primary Examiner—A. L. Wellington
Assistant Examiner—Adrian M. Wilson
(74) Attorney, Agent, or Firm—Oblon, Spivak, McLelland, Maier & Neustadt, P.C.

(57) ABSTRACT

A high speed machining machine-tool including a mechanical module having a machining station and a driving station and an equipment module with "n" number different parts located up line. The module bases are connected to a common supporting frame, with the mechanical module being fixedly connected thereto. The equipment module is connected to the machine so as to slide on its longitudinal axis. The different mobile parts of the machine-tool adopt two positions: a first, so-called "folded" position, in which the equipment module and all its parts engage each other and the mechanical module; a second, so-called "extended" position, in which the whole equipment module or a subset of its component parts have slid on the supporting frame towards the rear so as to form a transversal handling passage running through and through the machine. The invention is useful for high speed machining.

10 Claims, 4 Drawing Sheets

MACHINE-TOOL FOR HIGH SPEED MACHINING ADOPTING AN ERGONOMIC ARRANGEMENT FOR FUNCTIONAL PARTS THEREOF

CROSS-REFERENCE TO RELATED APPLICATIONS

This application claims benefit of priority under 35 U.S.C. § 119 to Patent Cooperation Treaty Application No. PCT/FR97/00976, filed on Jun. 3, 1997, the entire contents of which are incorporated by reference herein.

BACKGROUND OF THE INVENTION

1. Field of the Invention

The present invention relates to machine-tools and more particularly, to the arrangement of functional parts of a machine-tool for high speed machining to ensure handling and maintenance under the best conditions.

2. Discussion of Background

High speed machining generally takes place using a tool rotatably driven by the motor driven axis of an electric spindle installed in a ram, wherein the ram is mounted to be movable along X-, Y-, and Z-axes, which are mutually perpendicular to each other.

A machine-tool is typically provided with four main working stations, which are:

(1) an actual machining station, including the machine-tool, driven rotationally by the motor driven axis of the electric spindle, wherein the machine-tool shapes the workpiece to be machined;

(2) a driving station situated up-line (or upstream) from the machining station, wherein the driving station is made up of a group of devices that ensure, in particular, X-, Y-, and Z-axes movements of the ram of the electric spindle, as well as feeding of the electric spindle for the rotation of the electric spindle's tool carrier axis;

(3) a control station operating together with the driving station, wherein the control station functions by using a program of pre-established instructions to take charge of the different stages of machining of the workpiece; and (4) a magazine for storing tools in order to keep the machine-tools, to be used in the machining process, near the machining area, during the different stages of machining of the workpiece.

The machining station includes the machine-tool and electric spindle for machining the workpiece, wherein the machine-tool is driven by the motor driven axis of the electric spindle, which is fed by electric cables coming from the control station. The electric spindle is housed in a ram, which is movable in the X-, Y-, and Z-axes directions.

The driving station includes all of the motor elements to ensure the X-, Y-, and Z-axes movements of the ram.

The control station is connected to an electric group and a hydraulic group, as necessary, in order to distribute electric and hydraulic power, respectively, and to ensure control of the components using the electric and hydraulic power, respectively.

The function of the machine-tools is to machine the workpiece, in a minimum of time and with a maximum of precision. The shape of the workpieces to be machined is becoming more and more complex, thus requiring the use of several tools, from the nearby tool magazine, or even several machine-tools to ensure complete machining of the workpiece. A configuration including several of the machine-tools taking part in the machining of the same workpiece is called a "machine transfer." A "machine transfer" can become a "flexible workshop" to ensure the complete machining of several different workpieces. A "machine transfer" is a group of machine-tools which are placed perpendicular to the production line of the workpiece to achieve all the machining stages of that workpiece. Such an installation takes place with respect to limiting factors, namely, the dimension of the machine-tools and especially, the floorspace available for the machine-tools. It is therefore essential, for reasons of cost and space taken up, that the machine-tools be compact in order to enable the installation of a "flexible workshop" or a "machine transfer." In fact, a principal disadvantage of conventional machine-tools is that they take up a very large amount of floorspace, despite the miniaturization of the components that can presently be achieved. The size of the machine-tool corresponds, first of all, to the machining to be done. In other words, to have a machine-tool that can be flexible, it has to adapt to all machining types and to all dimensions. In any case, the electric spindle needs to be of large dimensions to ensure a high speed of rotation or a large engine power to enable the use of machine-tools of large dimensions. This leads to important dimensions of the ram and consequently, important dimensions of the motor elements to ensure the ram's movements in X-, Y-, and Z-axes directions. In the field in which the present invention applies, the machine-tools are of very large dimensions, so that the users lacking sufficient floorspace to house a machine-tool, must undertake extensions to their premises. This puts a considerable strain on the cost of installing there machine-tools, in addition to the actual cost of the machine-tools.

Another disadvantage of the machine-tools for high speed machining is the fact that it is necessary to authorize access to all the functional parts or components of the machine-tool to ensure adequate maintenance thereof. As a result, access areas which permit an operator to ensure the maintenance of the vital part of the machine-tool, in particular, access areas of the driving station, must be provided around doors, hatches, or windows. The doors, hatches, or windows were conceived to authorize maintenance of the machine-tool, but increase the floorspace needed to set up each machine-tool. In "machine transfers," even more floorspace is needed, so that not only the amount of floorspace needed to install the machine-tool is increased, but the number of conveyors conveying the workpieces from one machine-tool to another is increased as well.

Another disadvantage of the machine-tools for high speed machining is that they require the presence of a cooling group. In fact, the functioning of the machine-tools raises the temperature of the workpieces at the driving station to a level which would be detrimental for the lifespan of the workpieces, if subsidiary cooling was not set up. This rise in temperature could also lead to the dilatation of the parts of the driving station, which would have as a consequence thereof, a non-negligible loss of precision in the machining of workpieces. The cooling groups are generally of large dimension and are difficult to integrate into the machine-tools.

Starting with these considerations with respect to the original configuration of a machine-tool, applicant has attempted to reduce the floorspace requirement of the machine-tool, while making it easier to access the vital parts for handling, replacement, repair, etc. The configuration of the machine-tools of the present invention rests on a flexible ergonomic arrangement of the functional parts thereof, while avoiding the disadvantages described above with respect to conventional machine-tools.

SUMMARY OF THE INVENTION

According to the present invention, the machine-tool for high speed machining includes a mechanical module made up of a machining station, a driving station, and an equipment module. The equipment module has a variable number "n" of different parts located up-line. The bases of the mechanical and equipment modules are connected to a common or communal supporting frame. The mechanical module is fixedly connected to the common supporting frame. A longitudinal axis of the machine-tool for the equipment module is slidingly connected to the common supporting frame. The machine-tool has different parts, which are mobile and which adopt either of two positions, as follows:

(1) a first or "folded" position, wherein the equipment module and all of its different parts are placed against one another and against the mechanical module; and (2) a second or "extended" position, wherein the entire equipment module, or a subset of its component parts, have slid on the supporting frame, towards the rear of the machine-tool, so as to form a first handling passage, which runs transversely through the machine-tool.

The above-described flexible ergonomic arrangement has the advantage of adding only the width of the first handling passage to the length necessary for installing the machine-tool. The access areas to the vital parts of the machine-tool are considerably increased by the creation of the handling passage through the machine-tool, between each of the mechanical and equipment modules and between each different part constituting the mechanical and equipment modules.

Another advantage of the flexible ergonomic arrangement of the machine-tool of the present invention is the creation of a handling space running transversely through the machine-tool, while permitting the operator access to the core of the machine-tool. Thus, access for the handling or the maintenance of the different parts, from the inside of the machine-tool, permits the sides of the machine-tool to be kept free from any component needing intervention or handling.

Another advantage of the flexible ergonomic arrangement of the machine-tool of the present invention is that it is easier to reach the motor elements of the machine-tool from its core than from the side. Consequently, instead of opening onto the outside perimeter of the machine-tool, the access hatches can open into a handling passage, created for this purpose by the separation of the control station and the driving station.

Another advantage of the presence of the handling passage is that a machine-tool can be placed with one side against a wall, while staying entirely functional and accessible for its maintenance. In addition, the closing and the opening of the handling passage permits the placement of the machine-tool so as to be positioned in such a way that, its rear part is against a corner of the wall. Thus, the closing of the handling passage into its "folded" position permits access to the rear of the machine-tool and, the opening of the handling passage between both mechanical and equipment modules, or between the parts of the equipment module, permits access to the internal components.

The "folded" position has the advantage of creating a compact machine-tool. The closing of the handling passage ensures the protection of the mechanical, electrical, and hydraulic vital parts from the outside environment.

According to a particularly advantageous characteristic of the present invention, the machine-tool for high speed machining has a supporting frame, on which the equipment module slides. The supporting frame has a length such that when the equipment module does slide towards the rear of the machine-tool, either partially or as entirely, to arrive at the end of its course to go from a "folded" position to an "extended" position, a second handling passage is opened to permit handling between both mechanical and equipment modules, so that when the equipment module slides, only partly in any direction, the second handling passage between the different parts is opened and the first handling passage, that was previously open, is closed.

According to another preferred embodiment of the present invention, the machine-tool for high speed machining includes a machining station, a driving station, a control station, and a control desk. The machining, driving, and-control stations are connected to a common supporting frame. The machining, driving, and control stations are fixed to the common supporting frame so that the machining station and the driving station are situated up-line from the common supporting frame, and are separated from the control station by a handling passage running transversely through the machine-tool to permit access for an operator.

Two to three machine-tools can be placed in contact with one another. The machine-tools must have parallel Z-axes to ensure a savings of space due to the suppression of the intended gap between the machine-tools. This gap was previously necessary in order to enable an operator access from the side for maintenance. Furthermore, when two or three machine-tools are placed laterally against one another, the first and second handling passages, which are now fixed, pass through the aligned machine-tools to ensure communication between the first and second handling passages from one machine to another.

According to another particularly advantageous characteristic of the present invention, the mechanical and equipment modules of the machine-tool for high speed machining adopt a significantly parallelepipedic shape of the same width, thus ensuring a perfect symmetry about the Z-axis. The symmetry of the machine-tool as a whole permits several machine-tools to be place side by side in order to ensure a compact configuration to save on the necessary space. This savings of space is at the level of the clearance areas and permits the integration of more machine-tools onto the same floor area, when the machining line already includes a large number of machines. In addition, during the building and studying of the machine-tool installation on site, the symmetry considerably simplifies the process in abolishing the constraints of clearance areas and in setting up the accessories, such as the tool magazine or the control desk, which can be placed either on the right side or the left side of the machine-tool, depending on the way it was set up.

BRIEF DESCRIPTION OF THE DRAWING FIGURES

The fundamental concepts of the present invention having been exposed hereinabove in their most elementary form, more details and characteristics will come out more clearly when reading the description hereinafter, using as a non-limitative example and having regard to the attached drawings, an embodiment of a machine-tool for high speed machining with a flexible ergonomic arrangement of the functional parts according to the present invention. This description refers to the enclosed drawing figures, as follow.

Figure 1:
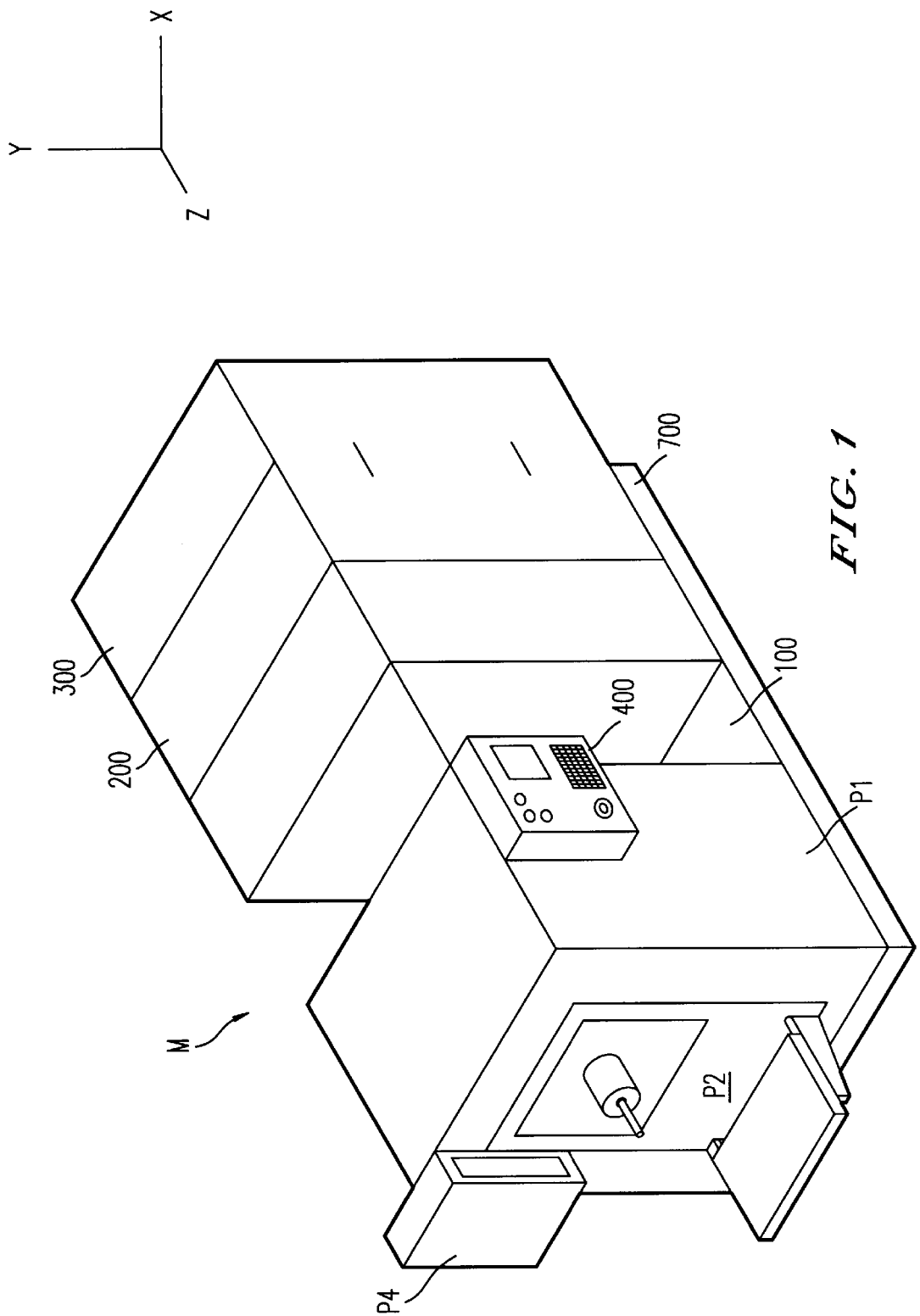
FIG. 1 is a perspective view of a machine-tool adopting the present invention's flexible ergonomic arrangement of the functional parts.
Figure 4C:
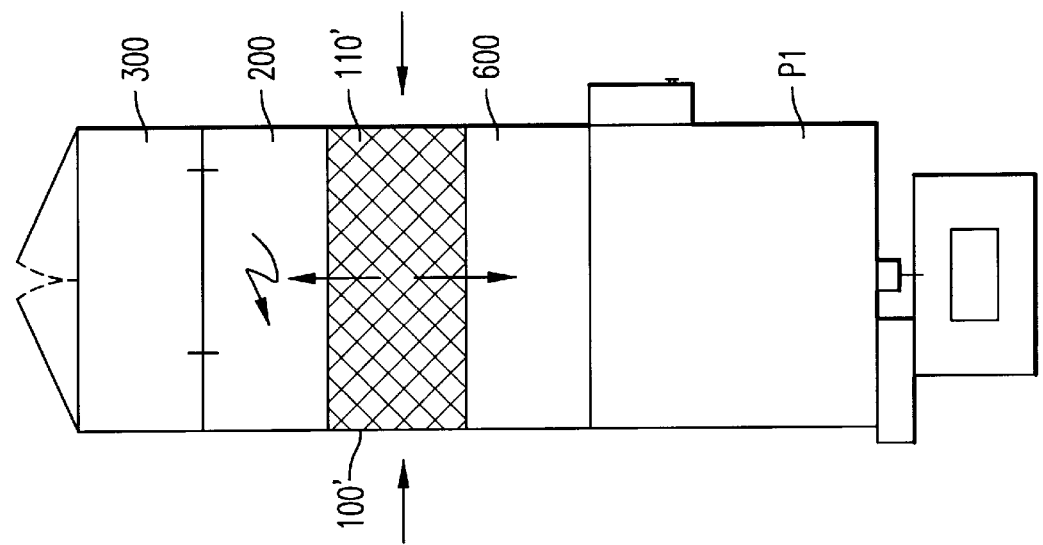
Figure 4B:
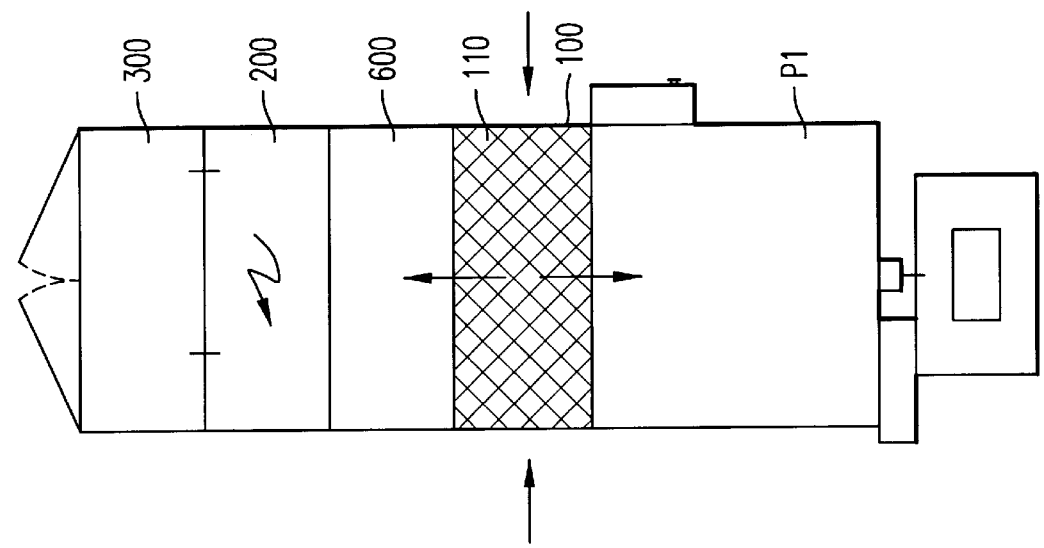
Figure 4A:
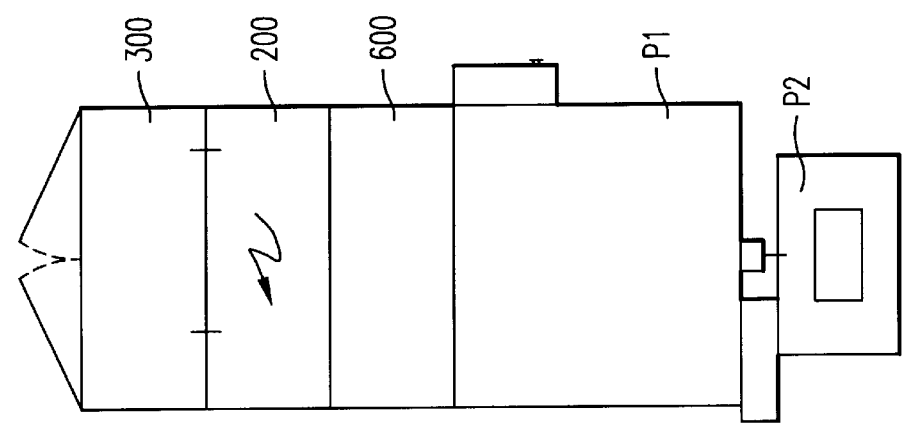

FIGS. 4a, 4b, and 4c are top views of the machine-tool of FIG. 1 adopting several configurations.

DETAILED DESCRIPTION OF THE PREFERRED EMBODIMENTS

As shown in FIG. 1, the machine-tool M for high speed machining includes a mechanical module and an equipment module. The mechanical module includes a machining station P2, a driving station P1, and a storage station P4. The driving station P1 includes all of the motor elements. The storage station P4 includes a tool magazine which permits keeping all of the tools necessary for the different machining stages that the machine-tool M has to execute available in a sealed chamber. The equipment module includes a control station P3 which includes several cupboards and power groups.

According to the main characteristic of the present invention, the mechanical and equipment modules are connected to a common supporting frame 700 on a base. The mechanical module is fixedly connected to the common supporting frame 700 and the equipment module is slidingly connected to the longitudinal axis of the machine-tool M.

As shown in FIG. 4a, the machine-tool M for high speed machining has an equipment module which is formed of two different parts. A first of the two different parts is a hydraulic group 600, which is placed against the mechanical module, when the machine-tool M is in its "folded" position, as illustrated. A second of the two different parts is a subset including a cooling group 300 and an electric cupboard 200. The cooling group 300 and the electric cupboard 200 are situated at the rear of the machine-tool M so that movement therein creates first and second handling passages 100 and 100', respectively.

The first handling passage 100 is opened between the mechanical module, formed by the machining station P2 and the driving station P1, and the hydraulic group 600, as shown in FIG. 4b. Thus, access to the hatch 500 of the driving station P1 is permitted, as well as to the control parts of the hydraulic group 600, which are situated on the side of the electric cupboard 200 of the hydraulic group 600.

The second handling passage 100' is opened by the movement of the electric cupboard 200 of the hydraulic group 600 towards the driving station P1 up to the position in full lock of the electric cupboard 200. Thus, the first handling passage 100, between the hydraulic group 600 and the subset (i.e., the cooling group 300 and the electric cupboard 200) is closed, as shown in FIG. 4c. The second handling passage 100' permits access to the hydraulic control parts situated on the side of the hydraulic group 600 and to the electric parts situated in the electric cupboard 200, when the access doors 210 and 220 are opened.

According to a preferred embodiment of the present invention, the electric cupboard 200, formed by the hydraulic group 600, does not have a transverse wall when in the "folded" position. The walls of the driving station P1, on the one hand, and the walls of the electric cupboard 200, on the other hand, seal the parallelepiped formed by the electric cupboard 200 of the hydraulic group 600.

According to a preferred embodiment of the present invention, the equipment module is formed by the subset (i.e., the electric cupboard 200 and the cooling group 300) and the hydraulic group 600. The hydraulic group 600 is slidingly mounted so as to translate on longitudinal slides. When the machine-tool M goes from the "folded" position, as shown in FIG. 4a, to an "extended" position, as shown in FIGS. 4b or 4c, the first and second handling passages 100 and 100' are fitted with first and second duckboards 110 and 110, respectively. This permits an operator to have access from above, between the longitudinal slides.

According to a particularly judicious characteristic, the second duckboard 110' is fixed at the base of the hydraulic group 600. Thus, the second duckboard 110' shows solidarity in all of its movements. The second duckboard 110' also fits under the electric cupboard 200, when the hydraulic group 600 is placed against the electric cupboard 200. Another advantage is that the hoses feeding the power are not disturbed by the presence of the second duckboard 110', which is fixed, when communicating under the electric cupboards 200, between the different parts of the equipment module, and between the mechanical and equipment modules.

According to another preferred embodiment of the present invention, the subset (i.e., the cooling group 300 and the electric cupboard 200) has a width equal to twice the width of the hydraulic group 600. The length, of the supporting frame 700 of the longitudinal slides, which permit sliding movement, is such that, when the machine-tool M is in its "folded" position, the total course of the equipment module or of only the subset, opens a handling passage having a width equal to the width of the hydraulic group 600. Therefore, the width of the handling passage is equal to half the width of the subset. This characteristic is important in that, as shown in FIG. 1, it enables the machine-tool M to extend to a length longer than the length of the sliding of the supporting frame 700. Thus, the subset is permitted an overhand of equal to half of its width. A shorter length of the frame 700 allows for freedom from any obstacle or guidance part at the rear area of the machine-tool M. Thus, an optimal compactness of the machine-tool M in the "folded" position is guaranteed.

Figure 2:
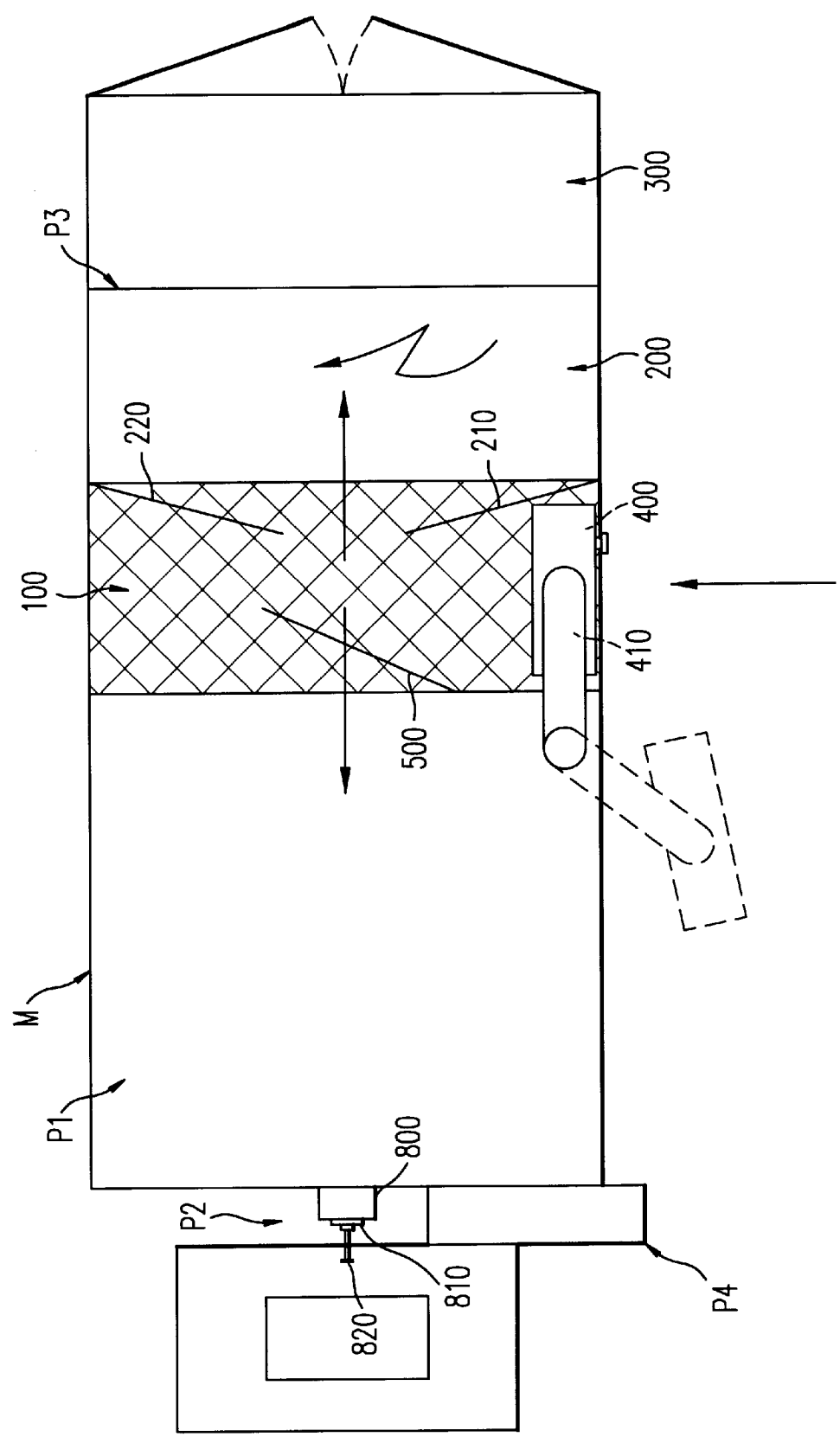
FIG. 2 is a top view of a machine-tool adopting a fixed position of the handling passage and the control station.

As shown in FIG. 2, the machine-tool M for high speed machining, according to a second embodiment as illustrated, includes a machining station P2, a driving station P1, a control station P3, and a control desk 400. The machining, driving and control stations P2, P1, and P3 are connected to a common supporting frame 700. The machine-tool M for high speed machining has different stations which are fixed to the common supporting frame 700. Thus, the machining station P2 and the driving station P1, which are situated up-line, are separated from the control station P3 by a first handling passage 100 running transversely through the machine-tool M to permit access for an operator. The control station P3 includes an electric cupboard 200 to ensure the distribution and the control of the electric parts of the machine-tool M and of a cooling group 300, which has its control on a side of the first handling passage 100, to ensure a controlled temperature to the electric parts, which are susceptible to a rise in temperature and to buckling.

According to a particularly advantageous characteristic of the present invention, the cooling group 300 is situated so as to open at the rear of the machine-tool M so that an operator can have access to the controls thereof. The advantage of this arrangement it that the cooling group 300 is left with an air gap opening to the outside, thereby permitting optimal ventilation. This advantage would not have been possible if the cooling group 300 had been situated between the electric cupboard 200 and the first handling passage 100. Furthermore, the electric cupboard 200, which includes the electric components, is situated between the cooling group 300 and the first handling passage 100. The access doors 210 and 220 of the electric cupboard 200 open into the first handling passage 100. This particular arrangement has the advantage of including all of the electric control components in the same chamber. Since the chamber is accessible from the first handling passage 100, it does not need a door or access hatch on the side of the machine-tool M.

According to a particularly advantageous characteristic of the present invention, a control desk 400 of the machine-tool M is placed in the first handling passage 100 and is pivotally mounted on a bracket 410. The bracket 410 is mounted on a vertical axis of the frame 700 of the machine-tool M. In this way, the control desk 400 is either: in a turned position (as represented by broken lines) so that the first handling passage 100 is free for the operator; or is back inside of the first handling passage 100 (as represented by continuous lines) so as to prevent the entire machine-tool M from having any "wart-shaped" components on a side thereof.

According to another particularly advantageous characteristic of the present invention, the driving station P1 is fitted with an access hatch 500, which opens into the first handling passage 100, thus permitting access to the vital parts of the machine-tool M (i.e., to the driving motor elements). This ensures the movement of the ram 800 in the X-, Y-, and Z-axes directions. The electric spindle 810 is housed in the ram 800 to ensure the rotational driving of a tool or spindle 820.

According to a preferred embodiment of the present invention, the hydraulic plate used to distribute the hydraulic power is situated in the driving station P1. Thus, the hydraulic plate is accessible from the access hatch 500 of the driving station P1.

The control desk 400 of the machine-tool M is housed, by rotation (continuous lines) of its bracket 410 on which it is fixed, inside of the first handling passage 100. It can therefore move apart to leave free passage to an operator (broken lines). The electric cupboard 200 and the cooling group 300 have a parallelepipedic shape which make their disposition easier in the compact group of the machine-tool M and permits the machine-tool M to adopt a perfectly symmetrical configuration given that the tool magazine and the control desk 400 of the machine-tool M can change sides.

Figure 3:
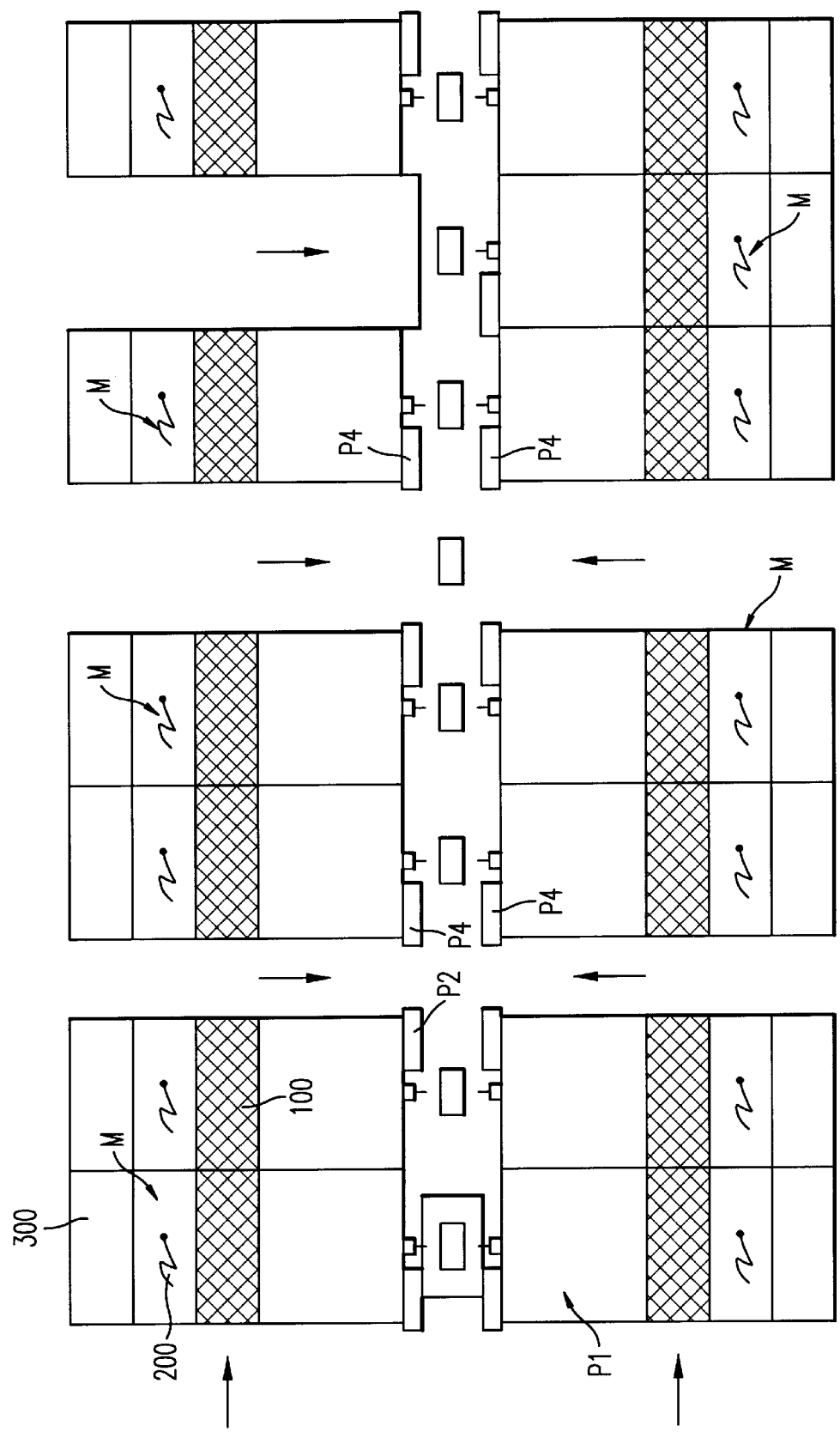
FIG. 3 is a top view of a "machine transfer", including several machine-tools, to ensure the machining of a workpiece, and illustrates the possibilities of the configuration offered by the flexible ergonomic arrangement of the functional pars of the machine-tools for high speed machining of FIG. 2.

The "machine transfer", as shown in FIG. 3, shows several machine-tools M for high speed machining, placed in a machining line so as to participate in the machining of one or more workpieces. From the particular arrangement of the functional parts, these machines can be placed one against the other by two or three, while being completely functional as to the maintenance of the vital parts, such as electric components in the electric cupboard 200, are carried out from the rear of the machine-tool M and that the maintenance of the motor elements of the driving station P1 or of the parts of the cooling group 300, are carried out in the core of the machine-tool M from the first handling passage 100. The groups of machine-tools M, placed one against another, are moved apart so as to permit access to the machining station P2 and to the tool magazine P4. The tool magazine P4 is advantageously placed on the side permitting access. The access to the tool magazine P4 and to the machining station P2 of the machine-tool M situated between two other tool-machines M is allowed when no machine-tools M are placed opposite to it. A "machine transfer" carried out with the machine-tools M of the present invention takes a lot less space than with conventional machine-tools for high speed machining.

Another advantage of the machine-tools M having a flexible ergonomic arrangement of functional parts thereof and in "machine transfer" is that the first handling passages 100 of each of the machine-tools M are in a line to form a large handling passage permitting the creation of a continuous handling line.

It is understood that the machine-tool for high speed machining of the present invention adopts a flexible, ergonomic arrangement for its functional parts which have been described and represented hereinabove. The functional parts are given for the purpose of disclosure and not limitation. It is obvious that various arrangements of, as well as modifications and improvements to, the above-described example will be possible without departing from the scope of the present invention taken in its broadest aspects and spirit. For example, several technological solutions could be adopted to ensure the movement of the functional parts of the equipment module of the module as a whole on the longitudinal axis of the machine-tool.

In order to permit better understanding of the drawings, a list of the reference symbols with their explanations is presented, as follows:

M machine-tool;
P1 driving station;
P2 machining station;
P3 control station;
P4 tool storage station;
100 first handling passage;
100' second handling passage;
110 first duckboard;
110' second duckboard;
200 electric cupboard;
210 access door (to electric cupboard 200);
220 access door (to electric cupboard 200);
300 cooling group;
400 control desk;
410 bracket;
500 access hatch (to driving station P1);
600 hydraulic group;
700 common supporting frame;
800 ram;
810 electric spindle; and
820 tool or spindle.

What is claimed as new and desired to be secured by Letters Patent of the United States is:

1. A machine-tool for high speed machining, said machine-tool comprising:
   a supporting frame; and
   a mechanical module having a base fixedly connected to said supporting frame, said mechanical module comprising,
   a machining station,
   a driving station; and
   an equipment module having both a plurality of different parts located up-line and a base slidingly connected to said supporting frame along a longitudinal axis of said machine-tool, wherein said plurality of different parts of the said equipment module can adopt any one of two positions including a first position, wherein said equipment module and said plurality of different parts are placed both against one another and against said mechanical module, and wherein a second position, wherein when any one of an entirety of said equipment module and a subset of said plurality of different parts of said equipment module have slid on said supporting frame towards a rear of said machine-tool, a first handling passage is formed transversely through said machine-tool.

2. The machine-tool according to claim 1, wherein a length of said supporting frame on which said equipment module slides is such that when said any one of said entirety of said equipment module and said subset of said plurality of different parts of said equipment module slide towards said rear of said machine-tool and arrives at an end of a course thereof to go from said first position to said second position, said first handling passage is formed to permit handling between said mechanical and equipment modules, such that when said equipment module slides, only partly in any direction, a second handling passage is formed between said plurality of different parts of said equipment module and said first handling passage, which was previously open, becomes closed.

3. The machine-tool according to claim 1, wherein said plurality of different parts of said equipment module includes a hydraulic group, which is placed against said mechanical module when said machine-tool is in said first position and said subset of said equipment module, which includes a cooling group and an electric cupboard situated at said rear of said machine-tool so that movement of said cooling group and said electric cupboard creates said first handling passage and a second handling passage, respectively, said first handling passage between said mechanical module and said hydraulic group of said equipment module and said second handling passage between said hydraulic group of said equipment module and said subset of said equipment module including said cooling group and said electric cupboard.

4. The machine-tool according to claim 1, further comprising a machining station, a driving station, a control station and a control desk, wherein said machining, driving, and control stations are connected to a communal supporting frame, and wherein said machining, driving, and control stations are fixed to said communal supporting frame so that said machining station and said driving station, which are situated up-line from said communal supporting frame, are separated from said control station by a passage running transversely through said machine-tool to permit access for an operator.

5. The machine-tool according to claim 4, wherein said control station includes a cooling group, and wherein said cooling group is situated so as to open at said rear of said machine-tool for the operator to have access to controls thereof.

6. The machine-tool according to claim 4, wherein said control station includes a cooling group and an electric cupboard, said electric cupboard including electric components, said electric cupboard being situated between said cooling group and said first handling passage, and said electric cupboard having access doors which open onto said first handling passage.

7. The machine-tool according to claim 6, wherein said driving station includes an access hatch at a rear thereof, said access hatch opening onto said first handling passage between said control station and said driving station.

8. The machine-tool according to claim 2, wherein said control desk is mounted on a bracket, said bracket being pivotally mounted on said communal supporting frame of said machine-tool permitting said control desk to any one of close said first handling passage, open said first handling passage, and close and open said first handling passage, by rotation of said bracket.

9. The machine-tool according to claim 8, wherein said hydraulic plate, used to distribute hydraulic power, is situated in said driving station so that said hydraulic plate is accessible by said access hatch of said driving station.

10. The machine-tool according to claim 9, wherein said mechanical and equipment modules adopt a slightly parallelepipedic shape having a width which is the same as a width of said machine-tool, thus ensuring a perfect symmetry about a Z-axis.

* * * * *